Jan. 11, 1927. 1,613,935
J. J. CATRON
LEVEL INDICATING AND CONTROLLING MEANS FOR LIQUID DISPENSERS
Original Filed Sept. 29, 1923 3 Sheets-Sheet 1

Inventor
J. J. Catron
By Jack A. Schley.
Attorney

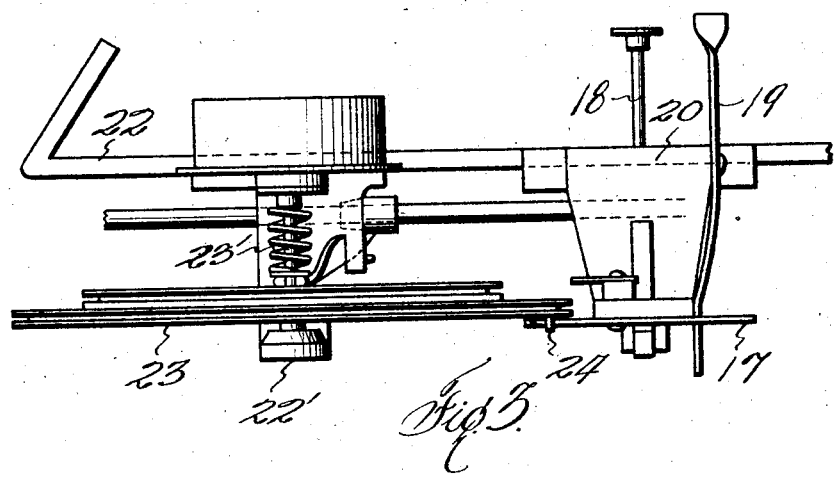
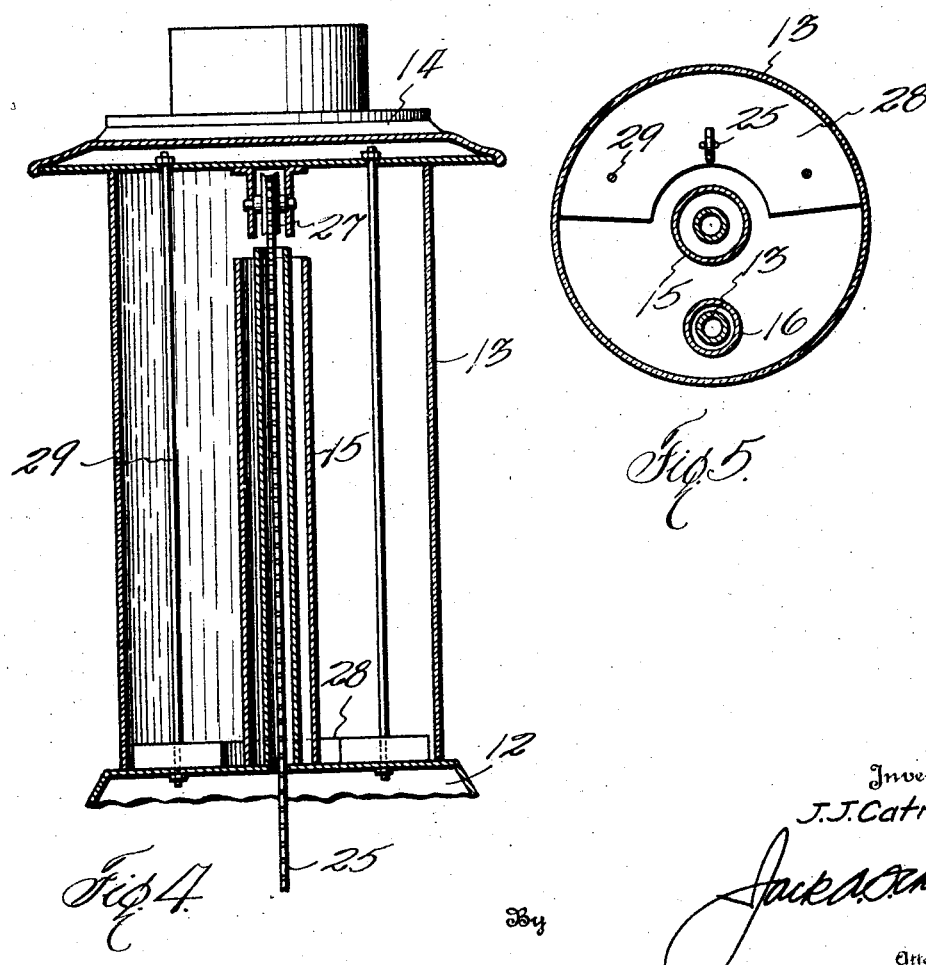

Jan. 11, 1927.  
J. J. CATRON  
1,613,935  
LEVEL INDICATING AND CONTROLLING MEANS FOR LIQUID DISPENSERS  
Original Filed Sept. 29, 1923   3 Sheets-Sheet 3

Inventor  
J. J. Catron  
By  
Attorney

Patented Jan. 11, 1927.

1,613,935

UNITED STATES PATENT OFFICE.

JOHN J. CATRON, OF BONHAM, TEXAS, ASSIGNOR TO CATRON MANUFACTURING COMPANY, OF BONHAM, TEXAS.

LEVEL INDICATING AND CONTROLLING MEANS FOR LIQUID DISPENSERS.

Original application filed September 29, 1923, Serial No. 665,582. Divided and this application filed July 25, 1924. Serial No. 728,269.

This invention relates to new and useful improvements in level indicating and controlling means for liquid dispensers.

The object of the invention is to provide a movable measure indicator in connection with a visible measuring receptacle and a float, whereby the exact quantities of liquid dispensed from the receptacle are indicated.

A further object is to provide in connection with an indicator a liquid supply means and a cut off for said supply means operated by the indicator, together with means for cutting off the supply at various measurements which may be observed on the indicator.

Another object is to provide a revolving measuring wheel impelled in one direction by a float and in the opposite by a weight and provided with symbols adapted to register with an index, together with a tripping element for cutting off a liquid supply when the wheel has revolved to its normal position.

This application is a division of my co-pending application filed September 29, 1923, Serial No. 665,582.

A construction designed to carry out the invention will be hereinafter described together with other features of the invention.

Figures 1, 2:
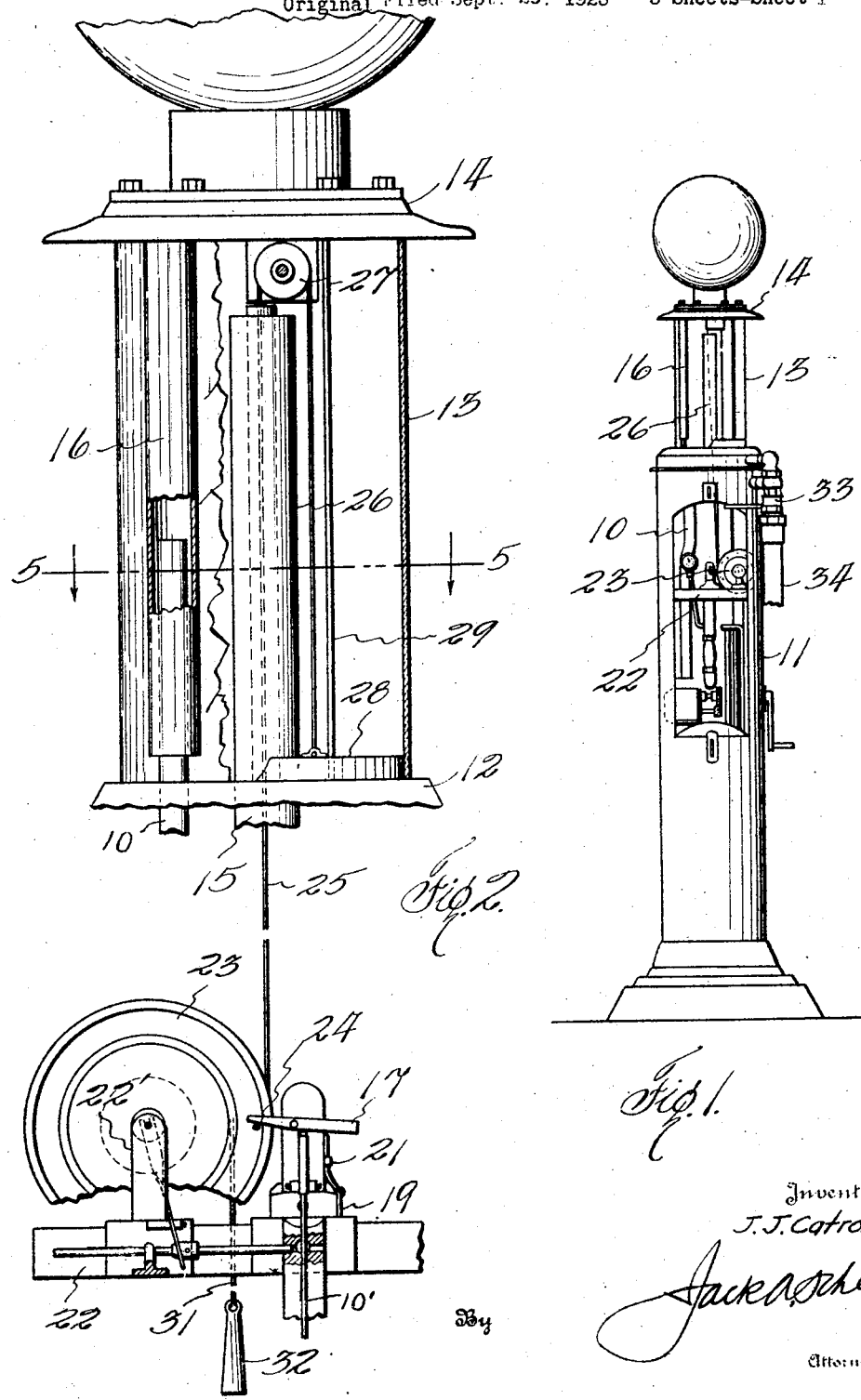
Figure 6:
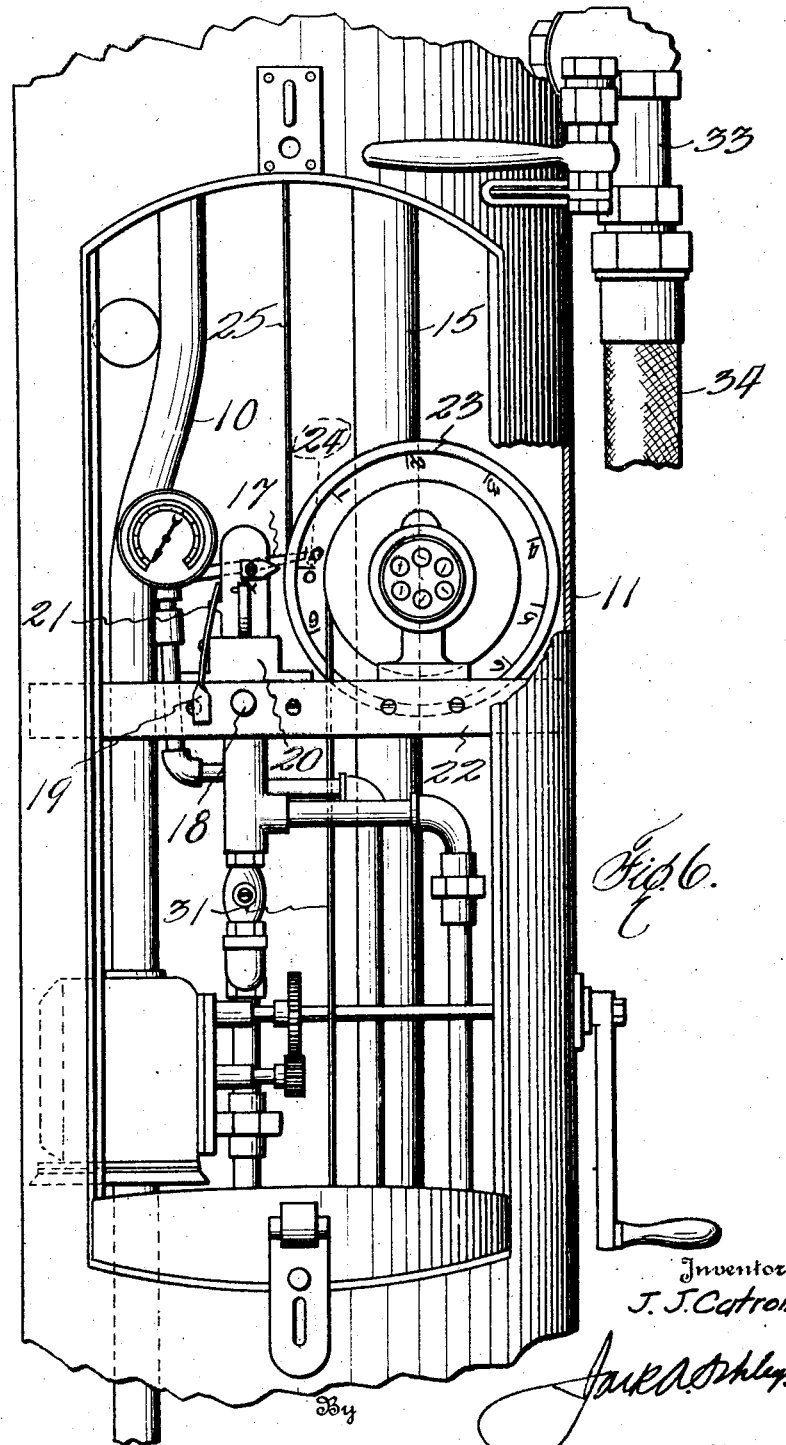

The invention will be more readily understood from a reading of the following specification and by reference to the accompanying drawings, in which an example of the invention is shown, and wherein:

Fig. 1 is an elevation of complete liquid dispenser with which my invention is used, Fig. 2 is a view in elevation showing the main elements of a level indicator means constructed in accordance with my invention, Fig. 3 is an enlarged plan view of the measuring wheel and the tripping means, Fig. 4 is an enlarged vertical sectional view of the measuring receptacle, Fig. 5 is a cross-sectional view on the line 5—5 of Fig. 4, and Fig. 6 is an enlarged view of the upper portion the cabinet.

In the drawings the numeral 10 designates a liquid supply pipe which leads up through a cabinet 11 to the base 12 of a visible measuring receptacle composed of a glass cylinder 13 resting on the base and covered by a cap 14. An overflow pipe 15 leads from a point in the receptacle down through the cabinet to the underground storage tank (not shown). The upper end of the supply pipe terminates in a sleeve 16 (Fig. 2) open in the measuring receptacle at its lower end, whereby liquid flows into the receptacle, free from bubbles and excessive agitation.

Compressed air is employed to elevate the liquid in the supply pipe 10 as is explained in my co-pending application above referred to. Suitable controlling valves are arranged in the cabinet. The valve for controlling the air supply to elevate the liquid is operated by a lever 10′ which is locked open by means of latch bar 17 and is operated by a hand plunger 18. A finger tripping lever 19 is pivoted on the side of a bracket 20 and is pivoted under the bar 17 by a lug 21. These parts are more fully disclosed in my copending application Serial No. 665,582.

The bracket 20 is mounted on a transverse supporting bar 22 fastened in the cabinet. While I have illustrated the invention in connection with an air pressure liquid supply, it is to be understood any suitable means of supplying liquid to the measuring receptacle may be employed. An important element of the invention is a revolving indicator employed to indicate the number of gallons or other units of measurement, dispensed, as the liquid is discharged from the receptacle as well as to trip the latch bar 17 to cut off the supply of liquid when the receptacle is full.

For this purpose a measure indicating wheel 23 is mounted to the right (Fig. 3) of the latch bar and has a pin 24 (Fig. 2) on its rear side. The wheel is journaled on a shaft 23′ supported in a bracket 22′ mounted on the bar 22. This wheel has a peripheral groove in which one end of a flexible connection 25 is wound. This connection passes up through the base 12 and through a tube 26 to a pulley 27 suspended in the top of the measuring receptacle (Fig. 2). The connection passes over the pulley and down to a float 28 slidable in the cylinder 13 on vertical guide rods 29. The wheel 23 has a grooved drum, concentrically mounted on its face. From the same side as the connection 25, a second flexible connection 31 hangs from the drum. A counter weight 32 is attached to the connection 31 and acts to counter-balance the float 28, and by unwinding from the drum, when the float is elevated, said connection 31 revolves the wheel 23 in a counter-clockwise direction whereby the connection 25 is wound thereon.

When the float approaches the top of the cylinder 13 the pin 24 approaches the end of the bar 17, and as the float finishes its upward movement the pin engages and trips the latch bar 17, which thus releases the supply valve lever 10', thereby cutting off the supply of liquid to the cylinder 13. In case it is desired to trip the bar 17, when the cylinder has been partially filled, the finger lever 19 is depressed.

The measuring receptacle has a suitable dispensing valve 33 suitably connected therewith and located on the outside of the cabinet. A hose 34 is connected with the valve. The wheel 23 extending radially beyond the drum 30 provides an annular panel in which numerals ranging from 0 to 10 are spaced in counter-clockwise order. These numerals register with a pointer 35, when the wheel is revolved.

In operating the dispenser the operator depresses the plunger 18 whereby the lever 10' of the supply valve is swung and locked by the bar 17. The supply valve being opening, liquid is elevated through the pipe 10 to the cylinder 13. As the cylinder fills the float 28 (Fig. 2) rises and the connection 25 is wound upon the wheel 23, which is revolved in a counter-clockwise direction, by the unwinding of the connection 31 from the drum 30. When the wheel is revolved the numerals pass the pointer in inverse order starting with the numeral 10. When the float reaches the proper level in the cylinder 13 the pin 24 will strike the latch bar 17 and trip the latter, whereby the lever 10' will be released and the liquid supply valve will be closed. At this position the numeral 0 registers with the pointer.

Should it be desired to close the air supply valve and only partially fill the receptacle, the operator has merely to depress the finger lever 19 to trip the bar 17 (Figure 3). It is to be understood that after once depressing the plunger 18, the supply valve remains open. When the cylinder 13 is partially or entirely filled and the supply cut off, the dispensing valve 33 is opened to discharge the liquid from the receptacle.

As the liquid is discharged from the receptacle the float 28 is lowered thus unwinding the connection 25 from the wheel 23, which is thus revolved in a clockwise direction, thus winding the connection 31 on the drum 30. During the revolution of the wheel the numerals pass the pointer 35 in sequence, thus measuring off the gallons as they are dispensed.

What I claim, is:

1. In a device of the character described, the combination of a measuring receptacle, a float movable vertically in the receptacle, an indicator wheel having symbols adjacent its periphery, a pointer with which the numerals register when the wheel revolves, a flexible connection extending from the float and wound on the wheel, a drum of less diameter than said wheel mounted upon the axis of the wheel, and a weighted flexible connection wound on the drum in a direction opposite to the winding of the first named flexible connection.

2. As a sub-combination in a level indicator for liquid dispensers, a revoluble wheel having a solid body and means upon its periphery for receiving a flexible connection, and a circular drum secured to one face of the wheel at the axis thereof and of less diameter than the wheel to provide an annular panel on its face for level indicating numerals.

3. In a device of the character described, the combination of a measuring receptacle, a tube in the receptacle, a float movable vertically in the receptacle, a flexible connection passing through the tube, a pulley above the tube over which the connection passes, one end of the connection being attached to the float, and a measuring wheel about which the other end of the connection is wound.

4. In a device of the character described, the combination of a measuring receptacle, a tube in the receptacle, a float movable vertically in the receptacle, a flexible connection passing through the tube, a pulley above the tube over which the connection passes, one end of the connection being attached to the float, a measuring wheel about which the other end of the connection is wound, a drum attached to the wheel, and a counterbalanced flexible connection wound on the drum.

5. In a device of the character described, the combination of a measuring receptacle, a tube in the receptacle, a float movable vertically in the receptacle, a flexible connection passing through the tube, a pulley above the tube over which the connection passes, one end of the connection being attached to the float, a measuring wheel about which the other end of the connection is wound, a drum attached to the wheel, and a counterbalanced flexible connection wound on the drum, the wheel extending radially beyond the drum and having measuring numerals on its extended portion.

In testimony whereof I affix my signature.

JOHN J. CATRON.